US007592969B2

(12) United States Patent
Proctor, Jr. et al.

(10) Patent No.: US 7,592,969 B2
(45) Date of Patent: Sep. 22, 2009

(54) MULTIPLE-ANTENNA DEVICE HAVING AN ISOLATION ELEMENT

(75) Inventors: James A. Proctor, Jr., Melbourne Beach, FL (US); Kenneth M. Gainey, Satellite Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/000,257

(22) Filed: Dec. 11, 2007

(65) Prior Publication Data

US 2008/0136736 A1 Jun. 12, 2008

Related U.S. Application Data

(60) Provisional application No. 60/869,438, filed on Dec. 11, 2006.

(51) Int. Cl.
*H01Q 21/00* (2006.01)
*H04Q 7/20* (2006.01)

(52) U.S. Cl. ....................... 343/893; 343/844; 343/846; 455/11.1

(58) Field of Classification Search ................. 343/893, 343/844, 846; 455/11.1
See application file for complete search history.

(56) References Cited

U.S. PATENT DOCUMENTS 6,731,904 B1 * 5/2004 Judd ......................... 455/11.1
6,745,003 B1 6/2004 Maca et al.
6,911,939 B2 6/2005 Carson et al.
7,196,674 B2 3/2007 Timofeev et al.
7,283,101 B2 10/2007 Bisiules et al.
2003/0214443 A1 * 11/2003 Bauregger et al. .... 343/700 MS
2008/0158094 A1 * 7/2008 Rofougaran ................ 343/873
2008/0159364 A1 * 7/2008 Rofougaran ................ 375/219
2008/0311848 A1 * 12/2008 Proctor et al. .................. 455/9

OTHER PUBLICATIONS

International Search Report, PCT/US07/025234, International Search Authority US, Apr. 23, 2008.

* cited by examiner

*Primary Examiner*—Vibol Tan
(74) *Attorney, Agent, or Firm*—Andrea L. Mays; Linda G. Gunderson

(57) ABSTRACT

A multiple-antenna device is provided, comprising: a printed circuit board having a ground plane configured to provide electromagnetic isolation between a first side of the printed circuit board and a second side of the printed circuit board; a first non-conductive support member formed over the first side of the printed circuit board; a second non-conductive support member formed over the second side of the printed circuit board; a first antenna formed over the first non-conductive support member; and a second antenna formed over the second non-conductive support member, wherein the first antenna is electrically connected to a first feed point on a first portion of the printed circuit board that is not connected to the ground plane, and wherein the second antenna is electrically connected to a second feed point on a second portion of the printed circuit board that is not connected to the ground plane.

21 Claims, 7 Drawing Sheets

MULTIPLE-ANTENNA DEVICE HAVING AN ISOLATION ELEMENT

CROSS REFERENCE TO RELATED APPLICATIONS

The present invention is related to and claims priority from U.S. Provisional Patent Application No. 60/869,438, filed Dec. 11, 2006, entitled “METRO WIFI RF REPEATER,” the contents of which are incorporated herein by reference.

TECHNICAL FIELD

The present invention relates generally to wireless communication and more specifically to an antenna configuration associated with a wireless repeater, the antenna configuration made up of closely packaged antennas having orthogonal polarization and isolation to reduce electromagnetic coupling and to provide high directivity.

BACKGROUND OF THE INVENTION

In a wireless communication node, such as a wireless repeater designed to operate with a wireless system capable of simultaneous transmission and reception of packets (i.e., duplex operation), the orientation of the antenna units can be important in establishing non-interfering operation as it is critical that the receiver is not desensitized by the transmitted signals. This can include networks that use time division duplex (TDD), frequency division duplex (FDD), or other desired methods of duplex operation.

Furthermore, enclosing antenna modules and repeater circuitry within the same package is desirable for convenience, manufacturing cost reduction and the like, but such packaging can give rise to interference problems.

In a full duplex repeater package, one antenna or set of antennae may operate with, for example, a base station, and another antenna may operate with a subscriber. Since the multiple signals of the same or different frequency will be transmitted and received in antennae that are close together, isolation of those antennae becomes important, particularly when simultaneous transmission and reception on both sides of the repeater are performed.

Furthermore, since the repeater unit houses all of the circuitry within a single package, it is desirable to closely position the antennae with minimal antenna-to-antenna interaction while maintaining acceptable gain and in many cases acceptable directivity.

For ease of manufacture, an exemplary repeater should be configured such that it can be easily produced in high volume manufacturing operations using low cost packaging. The exemplary repeater should be simple to set up to facilitate easy customer operation. Additional problems arise however when packaging repeater antennae and circuitry in close proximity. First, it becomes difficult to achieve high isolation between antennae due solely to the close physical proximity even where directional antennae are used.

Simply put, as the antennae are placed closer together, the more likely the antennae will couple energy into each other, which reduces the isolation between the sides of the repeater. Maintaining an omni or semi-omni directional antenna pattern becomes difficult since overlapping radiation patterns of antennae which are placed close to each other tend to generate interference effects. Energy from the antennae can further be electrically coupled through circuit elements such as through a shared ground plane especially in configurations where multiple antennas are integrated and the ground plane is small. While the use of direction antenna can benefit the repeater in terms of increased range and reduced wireless signal variation due to Raleigh fading effects, directional antennas are not typically used for indoor applications, due to the requirement for directional alignment, which is beyond the capability or desire of the average user.

Some improvements can be obtained through cancellation or similar techniques where a version of a signal transmitted on one side of the repeater is used to remove the same signal if it appears on the other side of the repeater. Such cancellation however can be expensive in that additional circuitry is required, and can be computationally expensive in that such cancellation can result in the introduction of a delay factor in the repeater or alternatively can require the use of more expensive and faster processors to perform the cancellation function.

SUMMARY OF THE INVENTION

The present invention overcomes the above problems by providing a multiple-antenna device formed in a printed circuit board. The device includes a first antenna formed on a first side of the printed circuit board; a second antenna formed on a second side of the printed circuit board; a ground plane formed between the first antenna and the second antenna, the ground plane configured to provide electromagnetic isolation between the first and second antennae; a first non-conductive support member formed between the first antenna and the ground plane; a second non-conductive support member formed between the second antenna and the ground plane. The first antenna is electrically connected to a first feed point on the printed circuit board that is not connected to the ground plane, and the second antenna is electrically connected to a second feed point on the printed circuit board that is not connected to the ground plane.

A multiple-antenna device is also provided that includes a printed circuit board having a ground plane configured to provide electromagnetic isolation between a first side of the printed circuit board and a second side of the printed circuit board; a first non-conductive support member formed over the first side of the printed circuit board; a second non-conductive support member formed over the second side of the printed circuit board; a third non-conductive support member formed over the second side of the printed circuit board; a fourth non-conductive support member formed over the first side of the printed circuit board; a first antenna formed over the first non-conductive support member; a second antenna formed over the second non-conductive support member; a third antenna formed over the third non-conductive support member; and a fourth antenna formed over the fourth non-conductive support member.

A multiple-antenna device formed in a printed circuit board is also provided that includes a first antenna formed on a first side of the printed circuit board; a second antenna formed on a second side of the printed circuit board; a ground plane formed between the first antenna and the second antenna, the ground plane configured to provide electromagnetic isolation between the first and second antennae; a first non-conductive support member formed between the first antenna and the ground plane; a second non-conductive support member formed between the second antenna and the ground plane. The first antenna is electrically connected to a first feed point on the printed circuit board that is not connected to the ground plane, and the second antenna is electrically connected to a second feed point on the printed circuit board that is not connected to the ground plane.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Figure 1:
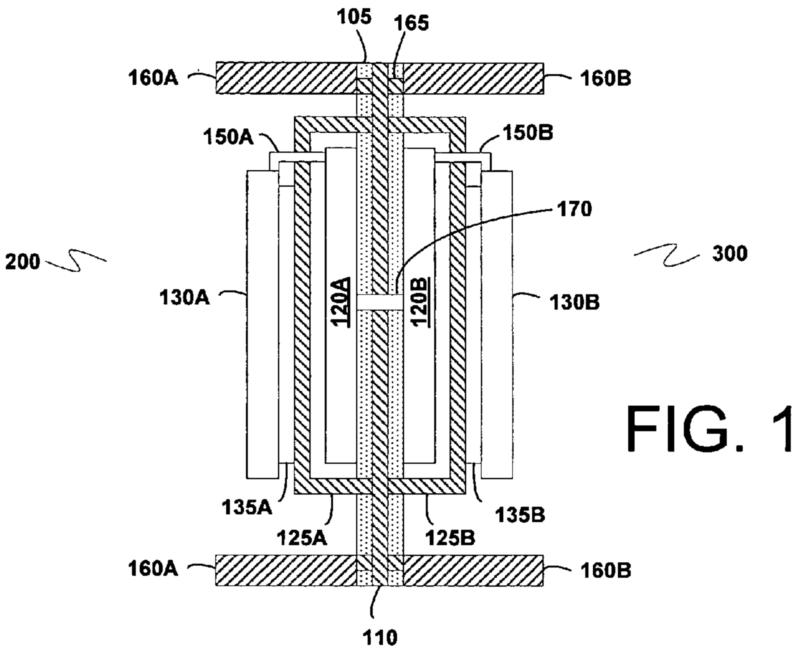
FIG. 1 is a side view of a two-antenna, multiple-transceiver device in accordance with various exemplary embodiments.
Figure 2:
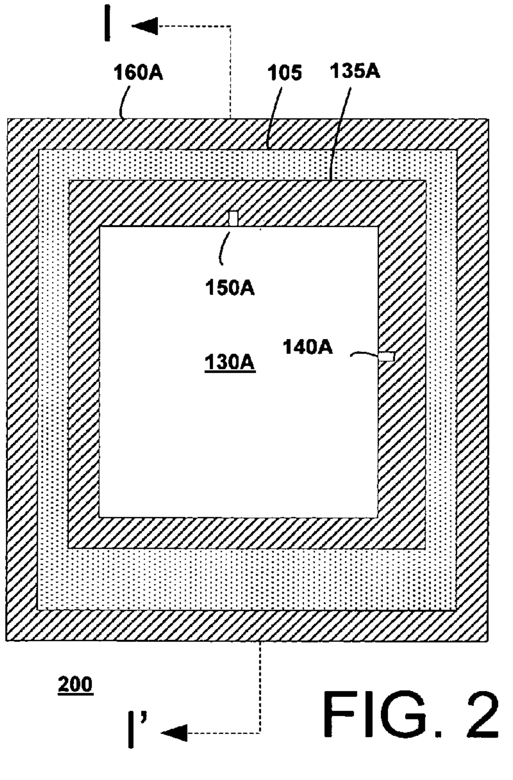
FIG. 2 is a top view of the two-antenna, multiple-transceiver device of FIG. 1 in accordance with various exemplary embodiments.

Applicants referring below to the drawings in which like numbers reference like components, and in which a single reference number may be used to identify an exemplary one of multiple like components Two-Antenna Multiple-Transceiver Device FIG. 1 is a side view of a two-antenna, multiple-transceiver device in accordance with various exemplary embodiments. FIG. 2 is a top view of the two-antenna, multiple-transceiver device of FIG. 1, and FIG. 3 is a bottom view of the two-antenna, multiple-transceiver device of FIG. 1.

Figure 3:
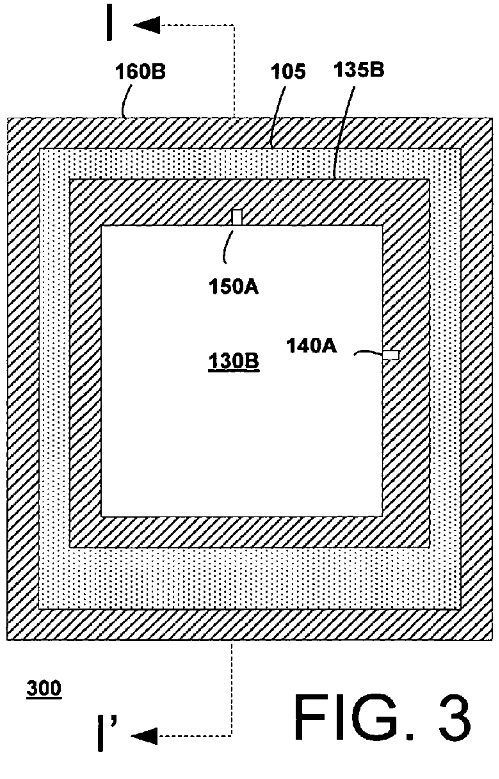
FIG. 3 is a bottom view of the two-antenna, multiple-transceiver device of FIG. 1 in accordance with various exemplary embodiments.

As shown in FIGS. 1-3, the device 100 includes a printed circuit board (PCB) 105, including a ground plane 110, and having a first side 200 and a second side 300, first and second transceiver circuitry 120A and 120B, first and second electromagnetic isolation elements 125A and 125B, first and second antennae 130A and 130B, first and second non-conductive support members 135A and 135B, first and second horizontal connection elements 140A and 140B, first and second vertical connection elements 150A and 150B, and first and second field-shaping elements 160A and 160B. The first and second transceiver circuitry 120A and 120B are electrically connected through a connection element 170 that passes through the ground plane 110, but is not connected to the ground plane 110.

The PCB 105 provides a structure to attach circuitry and can provide connection wires between various circuit elements. It including the ground plane 110, which can serve as a unified ground potential for any elements connected to the PCB 105. The ground plane 110 is also designed such that it isolates the EM fields radiating from the first antenna 130A on the first side 200 from the EM fields radiating from the second antenna 130B on the second side 300.

The first side 200 of the PCB 105 has the first transceiver circuitry 120A, the first electromagnetic isolation element 125A, the first antenna 130A, the first non-conductive support member 135A, and the first field-shaping element 160A formed on it. The first transceiver circuitry 120A is formed directly on the PCB 105; the first electromagnetic isolation element 125A is formed to cover the first transceiver circuitry 120A, such that it is electrically isolated; the first non-conductive support member 135A is formed on the first electromagnetic isolation element 125A, and the first antenna 130A is formed on the first non-conductive support member 135A. The first antenna 130A is connected to the first transceiver circuitry 120A via the first horizontal connection element 140A and the first vertical connection element 150A, which pass through the first electromagnetic isolation element 125A, but are not electrically connected to it. The first field-shaping element 160A is formed to surround the first antenna 130A.

The second side 300 of the PCB 105 has the second transceiver circuitry 120B, the second electromagnetic isolation element 125A, the second antenna 130B, the second non-conductive support member 135B, and the second field-shaping element 160B formed on it. The second transceiver circuitry 120B is formed directly on the PCB 105; the second electromagnetic isolation element 125B is formed to cover the second transceiver circuitry 120B, such that it is electrically isolated; the second non-conductive support member 135B is formed on the second electromagnetic isolation element 125B, and the second antenna 130B is formed on the second non-conductive support member 135B. The second antenna 130B is connected to the second transceiver circuitry 120B via the second horizontal connection element 140B and the second vertical connection element 150B, which pass through the second electromagnetic isolation element 125B, but are not electrically connected to it. The second field-shaping element 160B is formed to surround the second antenna 130B.

The first and second transceiver circuits 120A and 120B each include one or more transceivers that use the first and second antennae 130A and 130B to send and receive signals. The operational details of such transceivers would be understood by one of ordinary skill in the art and will not be described in detail. If more than one transceiver is provided, the multiple transceivers may be arranged in various manners such that they can communicate with some or all of the other transceivers and with one or both of the antennae 130A and 130B.

Although the disclosed embodiments disclose first and second transceiver circuits 120A and 120B, either or both of these could be replaced with dedicated transmitter or receiver circuits in embodiments in which a full transceiver is not required.

In the embodiments of FIGS. 1-3, two transceiver circuits 120A and 120B are provided, one on each side of the PCB 105, with the two electrically connected by the connection element 170. This is generally done to achieve efficient use of limited space on the PCB 105, and also possibly to balance out electrical signals across the PCB 105. However, alternate embodiments could use a single transceiver circuit formed on only one side of the PCB 105. In such a case, both antennae 130A and 130B would be connected to the single transceiver circuit.

In addition, although the embodiments of FIGS. 1-3 disclose that the transceiver circuits 120A and 120B are formed on the PCB 105, under the antennae 130A and 130B, respectively, this is by way of example only. In alternate embodiments transceiver circuitry (split up into multiple circuits or aggregated together), can be formed apart from the PCB 105. In such a case, the non-conductive support members 135A and 135B could be formed directly on the PCB 105, with the antennae 130A and 130B formed on the respective non-conductive support members 135A and 135B. The antennae 130A and 130B can then be electrically connected to wires on the PCB 105, which are then connected to the external transceiver circuitry.

The first electromagnetic isolation element 125A is located on the first side 200 of the device 100, above the first transceiver circuit 120A. It serves to electromagnetically isolate between the first transceiver circuit 120A. Likewise, the second electromagnetic isolation element 125B is located on the second side 300 of the device 100, above the second transceiver circuit 120B. It serves to electromagnetically isolate the second transceiver circuit 120B and the second antenna 130B. The first and second electromagnetic isolation elements 125A and 125B serve to minimize the possibility that EM radiation caused by the operation of the transceiver circuits 120A and 120B will interfere with the antenna on the respective side.

In some embodiments, the PCB 105 can be a multi-layer PCB, and one or both of the transceiver circuits 120A and 120B will be formed in the PCB 105. In this case, the first and second electromagnetic isolation elements 125A and 125B can be additional ground planes in the PCB 105. In other embodiments, first and second electromagnetic isolation elements 125A and 125B can be metal casings that fit over the respective transceiver circuits 120A and 120B, or any other suitable device for providing EM isolation. Regardless, the first and second electromagnetic isolation elements 125A and 125B should each be connected to the ground plane 110 so that they maintain the same electrical potential as the ground plane 110.

In some embodiments the first and second electromagnetic isolation element 125A and 125B may be configured to provide additional isolation between the first and second antennae 130A and 130B. In other embodiments, however, the first and second electromagnetic isolation element 125A and 125B may be configured primarily to provide isolation to the transceiver circuits 120A and 120B.

The first and second antennae 130A and 130B are EM antennae configured to transmit EM signals from or receive EM signals for the transceiver circuit 110. In some embodiments the first and second antennae 130A and 130B can be planar antennae, such as a patch antenna or a slot antenna, formed on or proximate to a PCB. However, any suitable antenna that can be properly isolated may be used in alternate embodiments, e.g., a dipole antenna, an "inverted F" antenna, etc.

In the embodiments of FIGS. 1-3, the antennae 130A and 130B are configured such that they can transmit signals that are orthogonal to each other to further reduce the interference between these signals. For simplicity of disclosure, they will be described as transmitting signals in a horizontal orientation and a vertical orientation that is orthogonal to the horizontal orientation. However, it should be understood that these represent any orientations that are orthogonal to each other, regardless of their relative orientation any reference plane, e.g., a local floor. For example, the "horizontal" orientation could be 45° from the floor, and the "vertical" orientation could be 135° from the floor. Other orientations are, of course, possible.

The first and second non-conductive support members 135A and 135B are formed out of a non-conductive material, and serve to separate the antennae 130A and 130B from the first and second electromagnetic isolation elements 125A and 125B. They may be solid or hollow, as desired. The dimensions and placement of the first and second non-conductive support members 135A and 135B may be selected to set certain transmission and reception parameters for the antennae 130A and 130B, since the separation between the antennae 130A and 130B and the first and second electromagnetic isolation elements 125A and 125B may influence the field parameters of the antennae 130A and 130B.

The first and second horizontal connection elements 140A and 140B connect a horizontal edge of a respective one of the first and second antennae 130A and 130B to a respective one of the transceiver circuits 120A and 120B such that signals can be transmitted or received in a horizontal orientation.

The first and second vertical connection elements 150A and 150B connect a vertical edge of a respective one of the first and second antennae 130A and 130B to a respective one of the transceiver circuits 120A and 120B such that signals can be transmitted or received in a vertical orientation.

Since these connection elements 140A, 140B, 150A, and 150B are formed at 90 degrees separations, they form orthogonal polarizations that can also be used in various configurations to improve isolations between the two antenna elements. They can also be used for diversity receiving of radio signals in the device 100.

In some embodiments one or more of the first and second horizontal connection elements 140A and 140B, and the first and second vertical connection elements 150A and 150B can be eliminated. For example, if the first antenna 130A only transmits and receives signals in a vertical orientation, and the second antenna 130B only transmits and receives signals in a horizontal orientation, then the first vertical connection element 150A and the second horizontal connection element 140B can be eliminated.

In alternate embodiments that use different kinds of antenna, the first and second horizontal connection elements 140A and 140B, and the first and second vertical connection elements 150A and 150B can be replaced with corresponding elements that cause the antenna to transmit signals in a given orientation.

The first and second field-shaping elements 160A and 160B are metallic structures formed around the edges of respective first and second antennae 130A and 130B to shape the fields (i.e., signals) radiating from one side of the antenna structures so that they the portion of those fields that reach the antenna on the opposite side are greatly reduced or eliminated. These field shaping elements 160A and 160B should be connected to the ground plane 110 via shaping connection elements 165, so that the field shaping elements 160A and 160B are at the same electrical potential as the ground plane 110.

The field-shaping elements 160A and 160B can be fences, extruded metal on the edges of a PCB, or an actual metal ring that encircles a PCB on the edge. It is also possible to form the field-shaping elements 160A and 160B out of provide serrations or other patterns on the edge of a PCB such that edge diffraction also the ground plane edges is reduced. In some embodiments, the field-shaping elements 160A and 160B can also be used as heat sinks.

The first and second field-shaping elements 160A and 160B may be omitted in some embodiments in which sufficient isolation is provided through the use of the ground plane 110 and electromagnetic isolation elements 125A and 125B, and orthogonal antennae. Some embodiments may also provide one or more field-shaping elements on one side of the device 100 and not the other.

In some embodiments, the field-shaping elements 160A and 160B could be made out of thin metal sheets and formed with spring fingers such that when lids of a device package are assembled with a PCB, the fingers are compressed against at least one ground plane to isolate EM fields from one side of the antenna with respect to fields on the opposite side. These structures can also be attached to the lids by groves or clips such that they can easily assemble these into the lid.

Four-Antenna Multiple-Transceiver Device

Although a two-antenna device is the simplest example of a multiple-antenna device with an electromagnetic isolation element, larger numbers of antennae can be used. FIGS. 4-10 describe embodiments using four antennae, two to a side.

Figure 4:
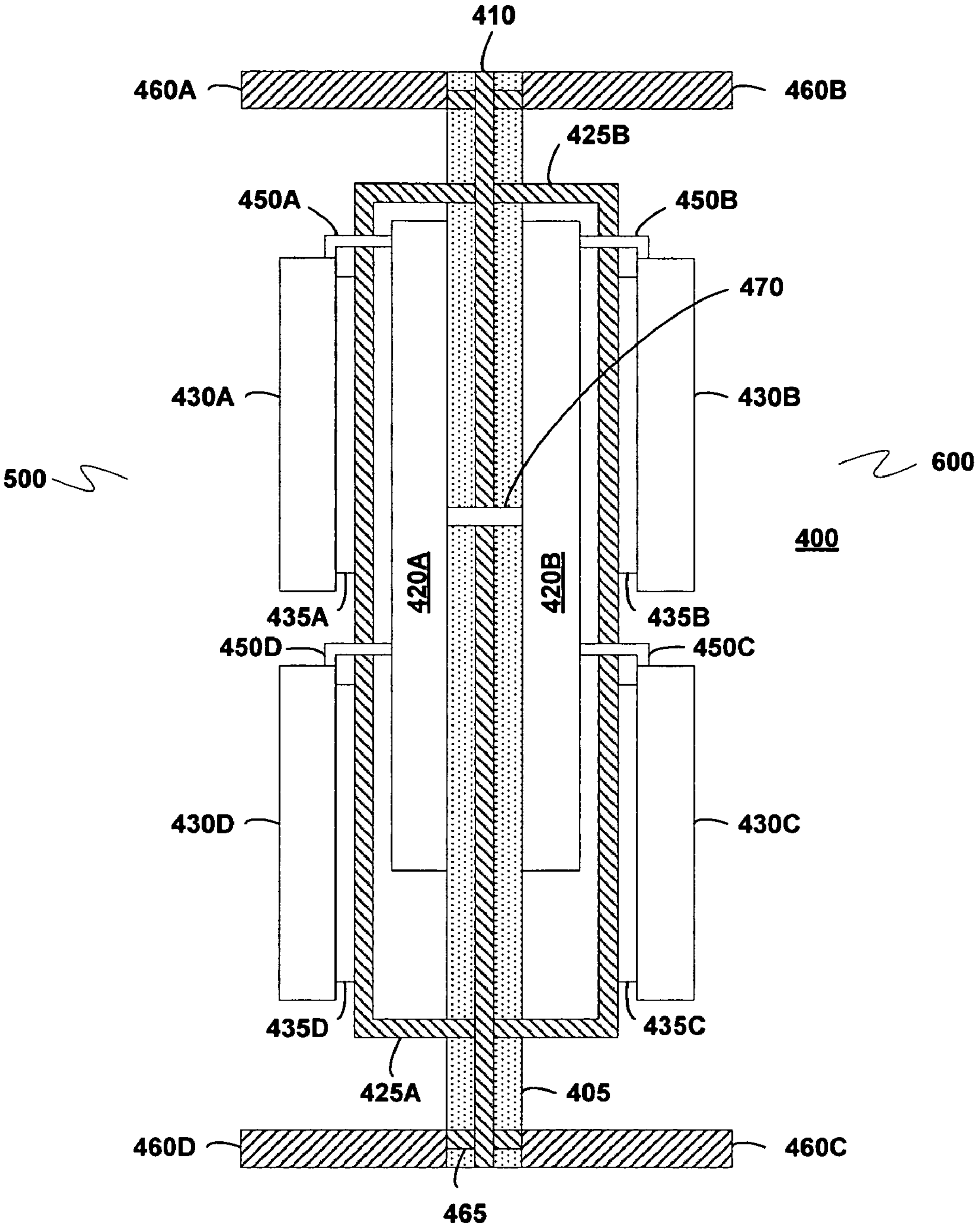
FIG. 4 is a side view of a four-antenna, multiple-transceiver device in accordance with various exemplary embodiments.
Figure 5:
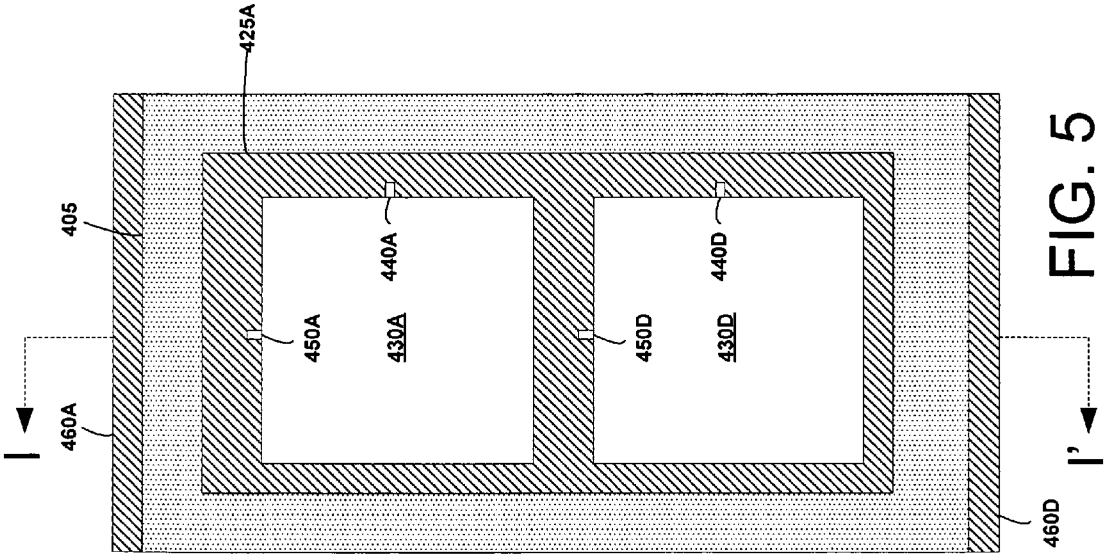
FIG. 5 is a top view of the four-antenna, multiple-transceiver device of FIG. 4 in accordance with various exemplary embodiments.

FIG. 4 is a side view of a four-antenna, multiple-transceiver device in accordance with various exemplary embodiments. FIG. 5 is a top view of the four-antenna, multiple-transceiver device of FIG. 4, and FIG. 6 is a bottom view of the four-antenna, multiple-transceiver device of FIG. 4.

Figure 6:
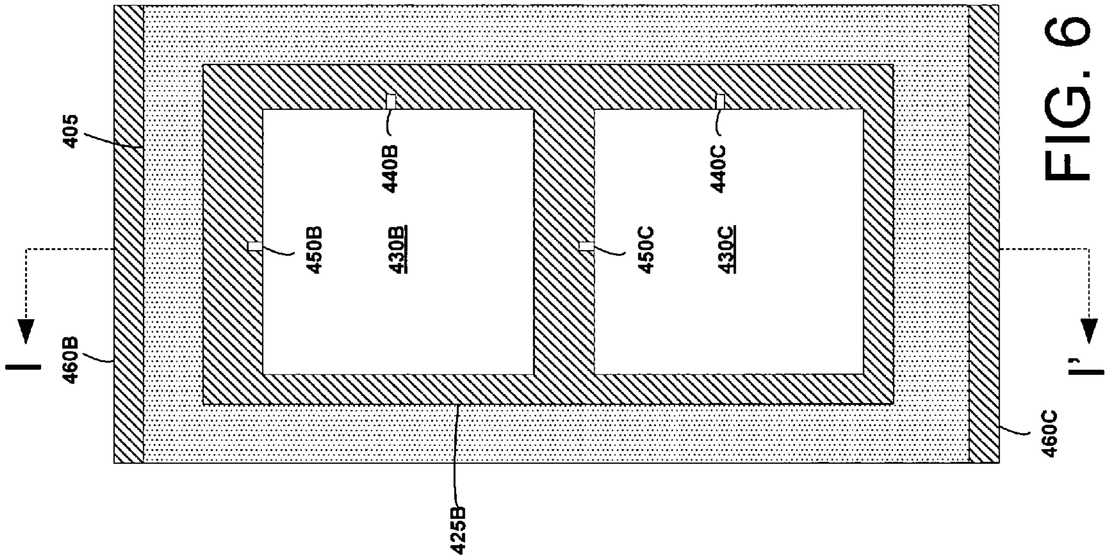
FIG. 6 is a bottom view of the four-antenna, multiple-transceiver device of FIG. 4 in accordance with various exemplary embodiments.

As shown in FIGS. 4-6, the device 400 includes a printed circuit board (PCB) 405, including a ground plane 410, and having a first side 500 and a second side 600, first and second transceiver circuitry 420A and 420B, first and second electromagnetic isolation elements 425A and 425B, first, second, third, and fourth antennae 430A, 430B, 430C, and 430D, first, second, third, and fourth non-conductive support members 435A, 435B, 435C, and 435D, first, second, third, and fourth horizontal connection elements 440A, 440B, 440C, and 440D, first, second, third, and fourth vertical connection elements 450A, 450B, 450C, and 450D, and first, second, third, and fourth field-shaping elements 460A, 460B, 460C, and 460D. The first and second transceiver circuitry 420A and 420B are electrically connected through a connection element 470 that passes through the ground plane 410, but is not connected to the ground plane 410.

The PCB 405 provides a structure to attach circuitry and can provide connection wires between various circuit elements. It including the ground plane 410, which can serve as a unified ground potential for any elements connected to the PCB 405. The ground plane 410 is also designed such that it isolates the EM fields radiating from the first and fourth antennae 430A and 430D on the first side 500 from the EM fields radiating from the second and third antennae 430B and 430C on the second side 600.

The first side 500 of the PCB 405 has the first transceiver circuitry 420A, the first electromagnetic isolation element 425A, the first and fourth antennae 430A and 430D, the first and fourth non-conductive support members 435A and 435D, and the first and fourth field-shaping elements 460A and 460D formed on it. The first transceiver circuitry 420A is formed directly on the PCB 405; the first electromagnetic isolation element 425A is formed to cover the first transceiver circuitry 420A, such that it is electrically isolated; the first and fourth non-conductive support members 435A and 435D are formed on the first electromagnetic isolation element 425A, and the first and fourth antennae 430A and 430D are formed on the first and fourth non-conductive support members 435A and 435D, respectively. The first and fourth antennae 430A and 430D are respectively connected to the first transceiver circuitry 420A via the first and fourth horizontal connection elements 440A and 440D and the first and fourth vertical connection element 450A and 450D, which pass through the first electromagnetic isolation element 425A, but are not electrically connected to it. The first and fourth field-shaping elements 460A and 460D are formed on the edges of the first and fourth antennae 430A and 430D, respectively.

The second side 600 of the PCB 405 has the second transceiver circuitry 420B, the second electromagnetic isolation element 425B, the second and third antennae 430B and 430C, the second and third non-conductive support members 435B and 435C, and the second and third field-shaping elements 460B and 460C formed on it. The second transceiver circuitry 420B is formed directly on the PCB 405; the second electromagnetic isolation element 425B is formed to cover the second transceiver circuitry 420B, such that it is electrically isolated; the second and third non-conductive support members 435B and 435C are formed on the second electromagnetic isolation element 425B, and the second and third antennae 430B and 430C are formed on the second and third non-conductive support members 435B and 435C, respectively. The first and fourth antennae 430B and 430C are respectively connected to the second transceiver circuitry 420B via the second and third horizontal connection elements 440A and 440D and the second and third vertical connection element 450B and 450C, which pass through the second electromagnetic isolation element 425B, but are not electrically connected to it. The second and third field-shaping elements 460B and 460C are formed on the edges of the second and third antennae 430B and 430C, respectively.

The first and second transceiver circuits 420A and 420B each include one or more transceivers that use at least one of the first through fourth antennae 430A-430D to send and receive signals. The operational details of such transceivers would be understood by one of ordinary skill in the art and will not be described in detail. If more than one transceiver is provided, the multiple transceivers may be arranged in various manners such that they can communicate with some or all of the other transceivers and with one or all of the antennae 430A-430D.

Although the disclosed embodiments disclose first and second transceiver circuits 420A and 420B, either or both of these could be replaced with dedicated transmitter or receiver circuits in embodiments in which a full transceiver is not required.

In the embodiments of FIGS. 4-6, two transceiver circuits 420A and 420B are provided, one on each side of the PCB 405, with the two electrically connected by the connection element 470. This is generally done to achieve efficient use of limited space on the PCB 405, and also possibly to balance out electrical signals across the PCB 405. However, alternate embodiments could use a single transceiver circuit formed on only one side of the PCB 405. In such a case, all of the antennae 430A-430B would be connected to the single transceiver circuit.

In addition, although the embodiments of FIGS. 4-6 disclose that the transceiver circuits 420A and 1420B are formed on the PCB 405, under the antennae 430A-430D, respectively, this is by way of example only. In alternate embodiments transceiver circuitry (split up into multiple circuits or aggregated together), can be formed apart from the PCB 405. In such a case, the non-conductive support members 435A-435D could be formed directly on the PCB 405, with the antennae 430A-430D formed on the respective non-conductive support members 435A-435D. The antennae 430A-430D can then be electrically connected to wires on the PCB 405, which are then connected to the external transceiver circuitry.

The first isolation element 425A is located on the first side 500 of the device 400, above the first transceiver circuit 420A. It serves to electromagnetically isolate the first transceiver circuit 420A. Likewise, the second electromagnetic isolation element 425B is located on the second side 600 of the device 400, above the second transceiver circuit 420B. It serves to provide electromagnetic (EM) isolation between the second transceiver circuit 420B and the second and third antennae 430B and 430C. The first and second electromagnetic isolation elements 425A and 425B serve to minimize the possibility that EM radiation caused by the operation of the transceiver circuits 420A and 420B will interfere with the antenna on the respective side.

In some embodiments, the PCB 405 can be a multi-layer PCB, and one or both of the transceiver circuits 420A and 420B will be formed in the PCB 405. In this case, the first and second electromagnetic isolation elements 425A and 425B can be additional ground planes in the PCB 405. In other embodiments, first and second electromagnetic isolation elements 425A and 425B can be metal casings that fit over the respective transceiver circuits 420A and 420B, or any other suitable device for providing EM isolation. Regardless, the first and second electromagnetic isolation elements 425A and 425B should each be connected to the ground plane 410 so that they maintain the same electrical potential as the ground plane 410.

In some embodiments the first and second electromagnetic isolation element 425A and 425B may be configured to provide additional isolation between the first and fourth antennae 430A and 430D and the second and third antennae 430B and 430C. In other embodiments, however, the first and second electromagnetic isolation element 425A and 425B may be configured primarily to provide isolation to the transceiver circuits 420A and 420B.

The first through fourth antennae 430A-430D are EM antennae configured to transmit EM signals from or receive EM signals for the transceiver circuits 420A and 420B. In some embodiments the first through fourth antennae 430A-430D can be planar antennae, such as a patch antenna or a slot antenna, formed on or proximate to a PCB. However, any suitable antenna that can be properly isolated may be used in alternate embodiments, e.g., a dipole antenna, an "inverted F" antenna, etc.

In the embodiments of FIGS. 4-6, the antennae 430A-430D are configured such that they can transmit signals that are orthogonal to one or more of the other antennae 430A-430D to further reduce the interference between these signals. For simplicity of disclosure, they will be described as transmitting signals in a horizontal orientation and a vertical orientation that is orthogonal to the horizontal orientation. However, it should be understood that these represent any orientations that are orthogonal to each other, regardless of their relative orientation any reference plane, e.g., a local floor. For example, the "horizontal" orientation could be 45° from the floor, and the "vertical" orientation could be 135° from the floor. Other orientations are, of course, possible.

The first through fourth non-conductive support members 435A-435D are formed out of a non-conductive material, and serve to separate respective antennae 430A-430D from the first and second electromagnetic isolation elements 425A and 425B. They may be solid or hollow, as desired. The dimensions and placement of the first through fourth non-conductive support members 435A-435D may be selected to set certain transmission and reception parameters for the antennae 430A-430D, since the separation between the antennae 430A-430D and the first and second electromagnetic isolation elements 425A and 425B may influence the field parameters of the antennae 430A-430D.

The first through fourth horizontal connection elements 440A-440D connect a horizontal edge of a respective one of the first through fourth antennae 430A-430D to a respective one of the transceiver circuits 420A and 420B such that signals can be transmitted or received in a horizontal orientation.

The first through fourth vertical connection elements 450A-450D connect a vertical edge of a respective one of the first through fourth antennae 430A-430D to a respective one of the transceiver circuits 420A and 420B such that signals can be transmitted or received in a vertical orientation.

Since these connection elements 440A-440D and 450A-450D are formed at 90 degrees separations, they form orthogonal polarizations that can also be used in various configurations to improve isolations between the two antenna elements. They can also be used for diversity receiving of radio signals in the device 400.

The exact selection of antenna orientation can vary from embodiment to embodiment, and can even vary throughout operation of the device 400. For example, the first and second antennae 430A and 430B can operate using the horizontal orientation, and the third and fourth antennae 430C and 430D can operate using the vertical orientation. In this way, the two antennae on a given side (first and fourth antennae 430A and 430D on the first side 500, and second and third antennae 430B and 430C on the second side 600), can be provided with some isolation, despite the fact that there is no electromagnetic isolation element between them. In the alternative, the first and fourth antennae 430A and 430D can operate using the horizontal orientation, and the second and third antennae 430B and 430C can operate using the vertical orientation. Any of the other possible permutations of orientations can also be used, as needed.

Since the antennae 430A-430D in these embodiments each have both a vertical and a horizontal feed, they can be selected as needed to transmit in the vertical or horizontal direction.

In some embodiments, however, one or more of the first through fourth horizontal connection elements 440A-440D, and the through fourth vertical connection elements 450A-450D can be eliminated. For example, if the first and second antennae 430A and 430B only transmit and receive signals in a vertical orientation, and the third and fourth antennae 430C and 430D only transmit and receive signals in a horizontal orientation, then the first and second horizontal connection element 440A and 440B, and the third and fourth vertical connection elements 450C and 450D can be eliminated. Numerous other permutations are possible, as would be understood by one of ordinary skill in the art.

In alternate embodiments that use different kinds of antenna, the first through fourth horizontal connection elements 440A-440D, and the first through fourth vertical connection elements 450A-450D can be replaced with corresponding elements that cause the antenna to transmit signals in a given orientation.

The first through fourth field-shaping elements 460A-460D are metallic structures formed around the edges of respective first through fourth antennae 430A-430D to shape the fields (i.e., signals) radiating from one side of the antenna structures so that they the portion of those fields that reach the antenna on the opposite side are greatly reduced or eliminated. These field shaping elements 460A-460D should be connected to the ground plane 410 via shaping connection elements 465, so that the field shaping elements 460A-460D are at the same electrical potential as the ground plane 110.

The field-shaping elements 460A-460D can be fences, extruded metal on the edges of a PCB, or an actual metal ring that encircles a PCB on the edge. It is also possible to form the field-shaping elements 460A-460D out of provide serrations or other patterns on the edge of a PCB such that edge diffraction also the ground plane edges is reduced. In some embodiments, the field-shaping elements 460A-460D can also be used as heat sinks.

Some or all of the field-shaping elements 460A-460D may be omitted in some embodiments in which sufficient isolation is provided through the use of the ground plane 410 and electromagnetic isolation elements 425A and 425B, and orthogonal antennae. Some embodiments may also provide one or more field-shaping elements on one side of the device 400 and not the other.

In some embodiments, the field-shaping elements 460A-460D could be made out of thin metal sheets and formed with spring fingers such that when lids of a device package are assembled with a PCB, the fingers are compressed against at least one ground plane to isolate EM fields from one side of the antenna with respect to fields on the opposite side. These structures can also be attached to the lids by groves or clips such that they can easily assemble these into the lid.

Figure 7:
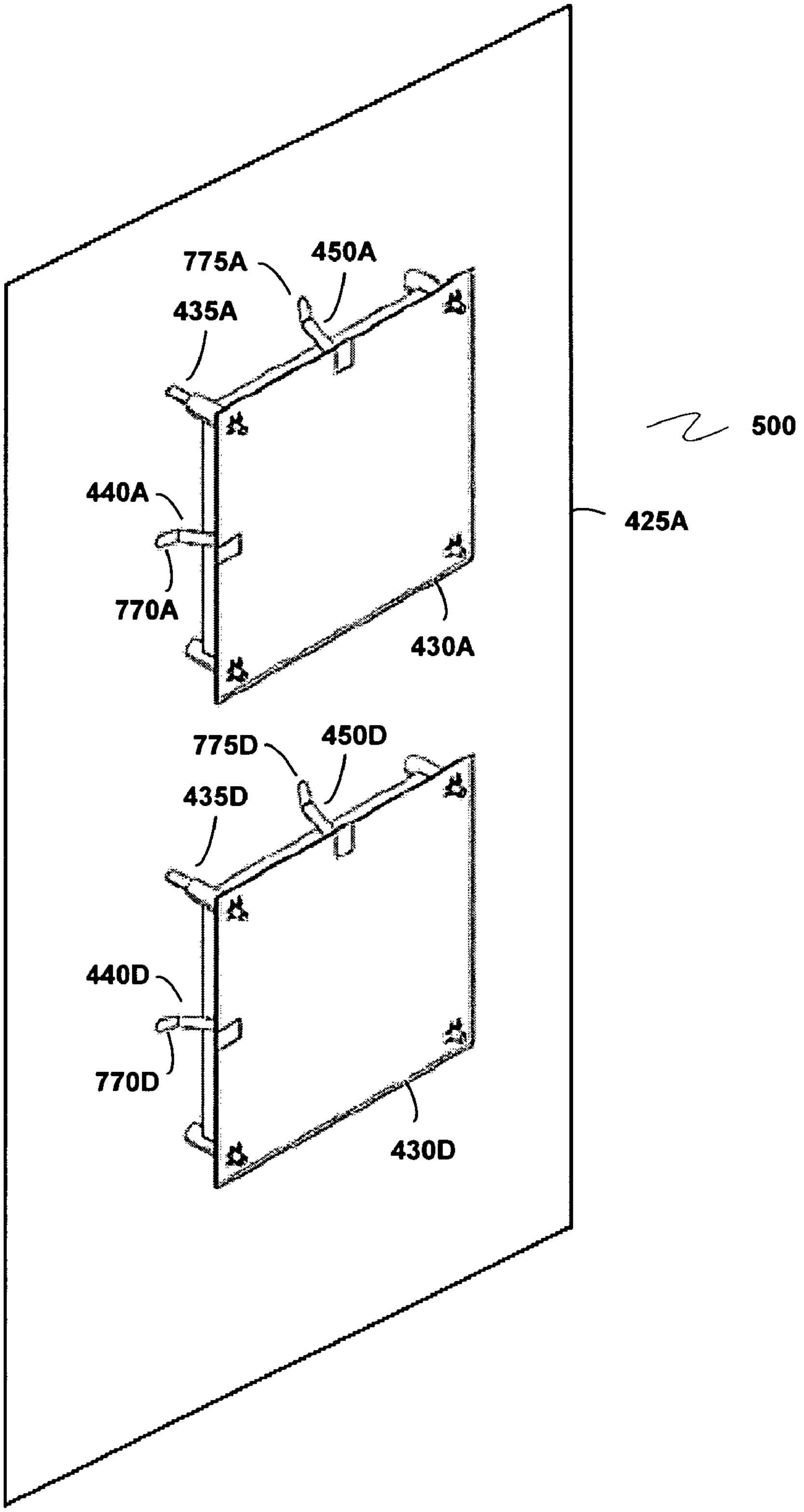
FIG. 7 is an illustrative view of the top side of the four-antenna, multiple-transceiver device of FIG. 4 in accordance with various exemplary embodiments.

FIG. 7 is an illustrative view of the top side of the four-antenna, multiple-transceiver device of FIG. 4 in accordance with various exemplary embodiments. As shown in FIG. 7, the first side 500 of the device 400 is shown by way of example. The first side 500 in the disclosed embodiments includes first and fourth antennae 430A and 430D.

The first and fourth antennae 430A and 430D in these embodiments are formed out of flat pieces of metal properly sized to radiate at desired frequencies of interest. The first and fourth vertical connection elements 450A and 450D, and the first and second horizontal connection elements 440A and 440D are integrated into the respective antennae 430A and 430D by bending down a protruded finger of the metal and attaching this to respective feed points 770A, 770D, 775A, and 775D, which are ultimately connected to one of the transceiver circuit 420A or 420B. In embodiments in which the electromagnetic isolation element 425A is a physical electromagnetic interference (EMI) shields formed over the transceiver circuit 420A, the feed points 770A, 770D, 775A, and 775D pass through the electromagnetic isolation element 425A to connect to the transceiver circuit 420A.

As also shown in FIG. 7, the non-conductive support elements 435A and 435D are square elements that fit under the respective antennae 430A and 430D, and are connected to the electromagnetic isolation element 125A by a plurality of posts.

Figure 8:
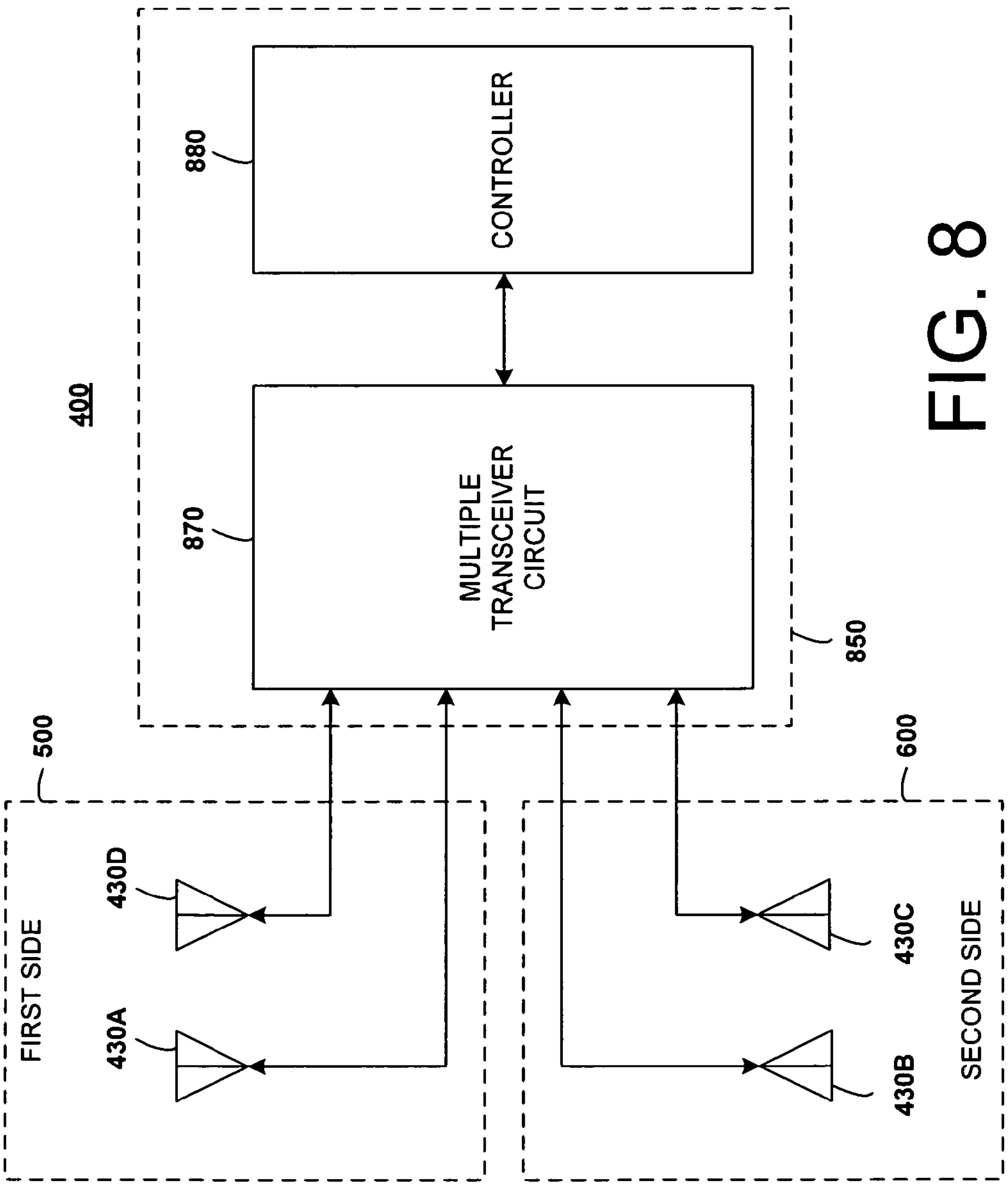
FIG. 8 is a block diagram of the four-antenna, multiple-transceiver device of FIG. 4 in accordance with various exemplary embodiments.

FIG. 8 is a block diagram of the four-antenna, multiple-transceiver device of FIG. 4 in accordance with various exemplary embodiments. As shown in FIG. 8, the device 400 includes a first side 500 having first and fourth antennae 430A and 430D, a second side 600 having second and third antennae 430B, and 430C, and a shielded multiple-transceiver element 850 including a multiple-transceiver circuit 870 and a controller 880.

The first and second sides 500 and 600 are described in detail above with respect to FIGS. 5 and 6. In the embodiments disclosed in FIG. 8, the first through fourth antennae 430A-430D are all bi-directional. In different operational modes, they can be used as a transmit/receive array, with some transmitting and some receiving as needed. In alternate embodiments, certain antennae can be dedicated transmit or receive antennae, as necessary.

The multiple-transceiver circuit 870 includes the PCB 405 and the first and second transceiver circuits 420A and 420B. It contains, all of the circuitry necessary for receiving signals from the antennae 430A-430D, and sending signals to the antennae 430A-430D. This may include amplifiers, filters, up and down converters, switches, frequency translation circuits, packet modulators and demodulators, signals detectors, automatic gain control circuits, and the like. As noted above, the general operation of transceivers is known in the art and will not be elaborated upon here.

The controller 880 includes the circuitry necessary to control the operation of the multiple-transceiver circuit 870. This may include a user interface, a channel monitoring circuit, a packet monitoring circuit, and a memory element. The general operation of such controllers is known in the art and will not be elaborated upon here.

Operation of a Four-Antenna Two-Transceiver Device

Figure 9:
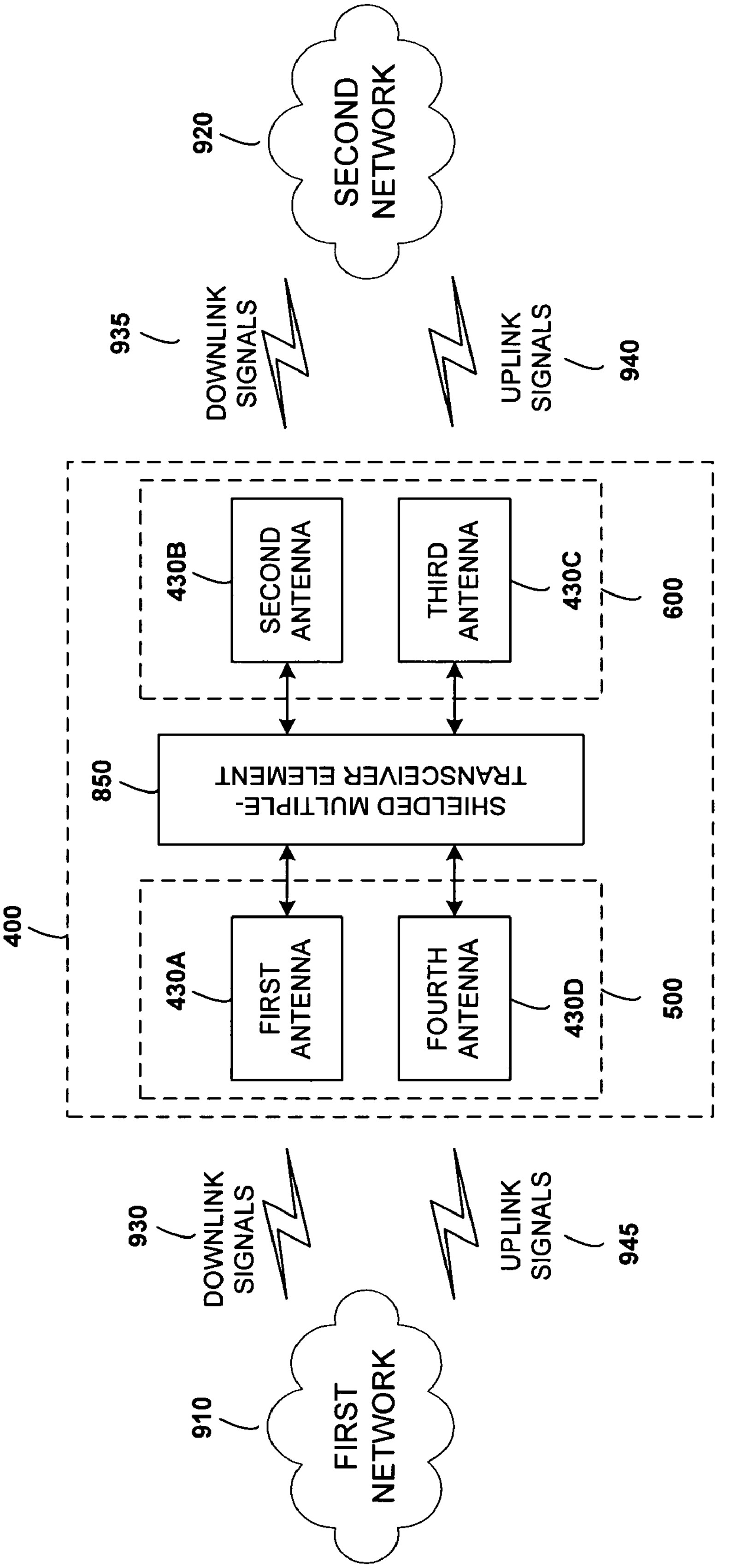
FIG. 9 is a block diagram of a network including the four-antenna, multiple-transceiver device of FIG. 4 in accordance with various exemplary embodiments.

FIG. 9 is a block diagram of a network 900 including the four-antenna, multiple-transceiver device of FIG. 4 in accordance with various exemplary embodiments. As shown in FIG. 9, the network 900 includes a multiple-antenna, multiple-transceiver device 400 communicating between a base station 910 and a subscriber 920.

The multiple-antenna, multiple-transceiver device 400 includes a first side 500 having first and fourth antennae 430A and 430D, a second side 600 having second and third antennae 430B, and 430C, and a shielded multiple-transceiver element 850. These elements are described in greater detail above.

The first and second networks 910 and 920 represents wireless networks that need to pass information between each other. Various embodiments could connect between different first and second networks 910 and 920. In one embodiment the first network 910 could be a cellular telephone network and the second network 920 could be a local area network (LAN), such as an IEEE 802.11 network. In another embodiment the first network 910 could be a cellular telephone network and the second network 920 could be a personal communication service (PCS) network. Other embodiments are possible, however, for any set of networks that need to be connected.

Operation of this network will be described with respect to first network 910 passing downlink signals 930 and 935 to the second network 920, and the second network 920 passing uplink signals 940 and 945 to the first network 910. However, this is by way of example only. The communications links 930, 935, 940, and 945 can be any set of desired signals.

When the second network 920 needs to send an uplink message to the first network 910, it transmits the uplink message in an uplink signal 940 that is received by the third antenna 430C on the second side 600 of the device 400. The third antenna 430C passes the uplink message through the shielded multiple-transceiver element 850 (i.e., past any electromagnetic isolation elements), and transmits the uplink message in an uplink signal 945 from the fourth antenna 430D on the first side 500 of the device 400. The uplink signal 945 is then received by the first network 910.

Likewise, when the first network 910 needs to send a downlink message to the second network 930, it transmits the downlink message in a downlink signal 930 that is received by the first antenna 430A on the first side 500 of the device 400. The first antenna 430A passes the downlink message through the shielded multiple-transceiver element 850 (i.e., past any electromagnetic isolation elements), and transmits the downlink message in a downlink signal 935 from the second antenna 430B on the second side 600 of the device 400. The downlink signal 935 is then received by the second network 920.

However, because the signals on the first side 500 (i.e., the downlink signals 930 and the uplink signals 945) are isolated from the signals on the second side 600 (i.e., the downlink signals 935 and the uplink signals 940) by the electromagnetic isolation element or the field-shaping elements, interference between the two sets of signals can be minimized, even though the transceivers for sending and receiving those two signals are formed on the same PCB.

In addition, the uplink signals 945 and the downlink signals 930 on the first side 500 of the device 400 can also be isolated through means, such as frequency division multiplexing, time division multiplexing, channel division multiplexing, orthogonal transmission, etc. Likewise, the uplink signals 940 and the downlink signals 935 on the second side 600 of the device 400 can be isolated through similar means.

In some situations there will be an easy physical demarcation between the first and second networks 910 and 920. For example, in one embodiment the first network 910 could be a cellular network, and the second network 920 could be a home LAN. This may occur when a subscriber who runs the LAN has access to the cellular network on some sort of a subscription basis.

In this case, the second network 920 (i.e., the LAN) will likely be strongest within the subscriber's house. The first network 910 (i.e., the cellular network) will likely be strongest outside of the subscriber's house. The multiple-antenna device 400 can thus be placed at or near a window in the house to take advantage of this fact. In particular, the first side 500 of the device 400 can be placed facing the window (i.e., facing the cellular network), while the second side 600 of the device 400 can be placed facing the interior of the house (i.e., facing the LAN).

This can be similarly effective in any situation in which a physical demarcation between two networks is prominent.

Although in the above disclosure the first and third antennae 430A and 430C are shown as operating as receiver antennae, and the second and fourth antennae 430B and 430D are shown as operating as transmitter antennae, this is by way of example only. These antennae 430A-430D may all be bi-directional antennae, and their operation can be changed as needed to send or transmit signals.

Operation Using Multiple Bands

Figure 10:
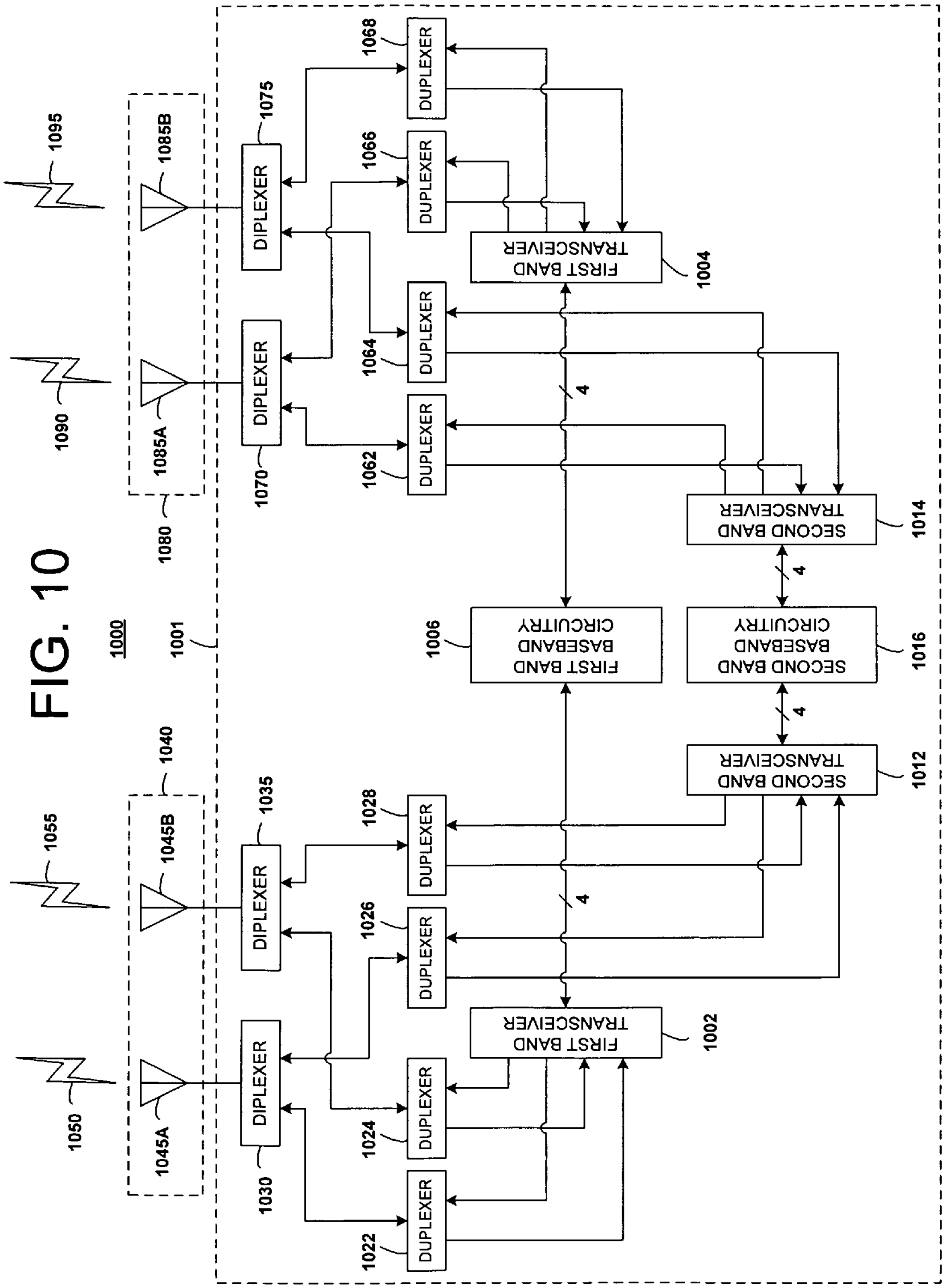
FIG. 10 is a block diagram of a four-antenna, multiple-transceiver device configured to operate in multiple bands in accordance with various exemplary embodiments

FIG. 10 is a block diagram of a four-antenna, multiple-transceiver device 1000 configured to operate in multiple bands in accordance with various exemplary embodiments. This device 1000 can transmit signals freely across two different bands using a variable configuration of the available antennae.

As shown in FIG. 10, the device 1000 includes a shielded multiple-transceiver element 1001 having a first side 1040 and a second side 1080. The shielded multiple-transceiver element 1001 includes first band transceivers 1002 and 1004, first band baseband circuitry 1006, second band transceivers 1012 and 1014, second band baseband circuitry 1016, duplexers 1022, 1024, 1026, 1028, 1062, 1064, 1066, and 1068; diplexers 1030, 1035, 1070, and 1075; the first side 1040 includes antennae 1045A and 1045B; and the second side 1080 includes antennae 1085A and 1085B. Although not shown in FIG. 10, the device 1000 includes at least one electromagnetic isolation element, as described above, providing electromagnetic (EM) isolation between the antennae 1045A and 1045B on the first side 1040, and the antennae 1085A and 1085B on the second side 1080.

The antenna 1045A can send or receive signals 1050; the antenna 1045B can send or receive signals 1055; the antenna 1085A can send or receive signals 1090; and the antenna 1085B can send or receive signals 1095. These antennae 1045A, 1045B, 1085A, and 1085B may be planar (e.g., patch) antennae, or any other desirable antenna types that may be effectively isolated from each other.

The first band transceiver 1002 is connected to the antennae 1045A and 1045B through the diplexers 1022, 1024, 1026, and 1028, and the duplexers 1030, and 1035 to send or receive data via the antennae 1045A and 1045B. The first band transceiver 1004 is connected to the antennae 1085A and 1085B through the diplexers 1062, 1064, 1066, and 1068, and the duplexers 1070, and 1075 to send or receive data via the antennae 1085A and 1085B. The first band baseband circuitry 1006 is connected between the first band transceiver 1002 and the first band transceiver 1004 to provide communication between these two circuits.

The second band transceiver 1012 is connected to the antennae 1045A and 1045B through the diplexers 1022, 1024, 1026, and 1028, and the duplexers 1030, and 1035 to send or receive data via the antennae 1045A and 1045B. The second band transceiver 1014 is connected to the antennae 1085A and 1085B through the diplexers 1062, 1064, 1066, and 1068, and the duplexers 1070, and 1075 to send or receive data via the antennae 1085A and 1085B. The second band baseband circuitry 1016 is connected between the second band transceiver 1012 and the second band transceiver 1014 to provide communication between these two circuits.

The diplexers 1030, 1035 are connected between the antennae 1045A and 1045B, and the duplexers 1022, 1024, 1026, 1028. They operate to determine which signals will be passed between the antennae 1045A and 1045B and the first band transceiver 1002, and between the antennae 1045A and 1045B and the second band transceiver 1012.

The diplexers 1030, 1035 are configured to split signals based on frequency, passing signals of a first frequency band to/from the duplexers 1022 and 1024, and passing signals of a second frequency band to/from the duplexers 1024 and 1028.

The duplexers 1022, 1024 are connected between the diplexers 1030, 1035, and the first band transceiver 1002; and the duplexers 1026, 1028 are connected between the diplexers 1030, 1035, and the second band transceiver 1012. These duplexers 1022, 1024, 1026, 1028, serve to route signals of slightly different frequencies within the first or second band, respectively, to properly direct transmitted or received signals between the first and second band transceivers 1002 and 1012 and the diplexers 1030, 1035.

The diplexers 1070, 1075 are connected between the antennae 1085A and 1085B, and the duplexers 1062, 1064, 1066, 1068. They operate to determine which signals will be passed between the antennae 1085A and 1085B and the first band transceiver 1004, and between the antennae 1085A and 1085B and the second band transceiver 1014.

The diplexers 1070, 1075 are configured to split signals based on frequency, passing signals of the second frequency band to/from the duplexers 1062 and 1064, and passing signals of the first frequency band to/from the duplexers 1064 and 1068.

The duplexers 1062, 1064 are connected between the diplexers 1070, 1075, and the second band transceiver 1014; and the duplexers 1066, 1068 are connected between the diplexers 1070, 1075, and the first band transceiver 1004. These duplexers 1062, 1064, 1066, 1068 serve to route signals of slightly different frequencies within the first or second band, respectively, to properly direct transmitted or received signals between the first and second band transceivers 1004 and 1014 and the diplexers 1070, 1075.

In alternate embodiments some of the duplexers 1022, 10624, 1026, 1028, 1062, 1064, 1066, 1068, 1070, and 1075, or diplexers 1030, 1035, 1070, and 1075 may be eliminated, since in some embodiments, certain permutations of band and antenna may be prohibited.

In other embodiments signals from different bands may be specifically assigned to certain transmission orientations. In such embodiments, the outputs of the duplexers 1022, 1024, 1026, 1028, 1062, 1064, 1066, and 1068 can be directly connected to the antennae 1045A, 1045B, 1085A, and 1085B. For example, the first band could be designated to always transmit/receive using a horizontal orientation, and the second band could be designated to always transmit/receive using a vertical orientation. In such an embodiment, the duplexer 1022 could be directly connected to a horizontal lead of the antenna 1045A; the duplexer 1024 could be directly connected to a horizontal lead of the antenna 1045B; the duplexer 1026 could be directly connected to a vertical lead of the antenna 1045A; the duplexer 1028 could be directly connected to a vertical lead of the antenna 1045B; the duplexer 1062 could be directly connected to a vertical lead of the antenna 1085A; the duplexer 1064 could be directly connected to a vertical lead of the antenna 1085B; the duplexer 1066 could be directly connected to a horizontal lead of the antenna 1085A; and the duplexer 1068 could be directly connected to a horizontal lead of the antenna 1085B.

Although the above embodiments show the use of only two or four antennae, along with two transceivers, this is by way of example only. Multiple-antennae, multiple-transceiver devices using different numbers of antennae or transceivers can also be used.

Furthermore, although the above embodiments all show antennae that are separate from a PCB, alternate embodiments could form the antennae directly on the opposite sides of the PCB. In such embodiments insulating layers within the PCB can form the required non-conductive support members to separate the antennae from the ground plane. Also, in such embodiments the transceiver will likely be formed off of the PCB, and connected to the antennae by wiring on the PCB. This sort of integrated structure can provide for a more compact device.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A multiple-antenna device comprising:

a printed circuit board having a ground plane configured to provide electromagnetic isolation between a first side of the printed circuit board and a second side of the printed circuit board;

a first non-conductive support member formed over the first side of the printed circuit board;

a second non-conductive support member formed over the second side of the printed circuit board;

a first antenna formed over the first non-conductive support member; and a second antenna formed over the second non-conductive support member, wherein the first antenna is electrically connected to a first feed point on a first portion of the printed circuit board that is not connected to the ground plane, and wherein the second antenna is electrically connected to a second feed point on a second portion of the printed circuit board that is not connected to the ground plane.

2. The multiple-antenna device of claim 1, wherein the first and second non-conductive support elements are integral to the printed circuit board.

3. The multiple-antenna device of claim 1, wherein the first and second antennae are each one of: a slot antenna, a patch antenna, a dipole antenna, and an inverted F antenna.

4. The multiple-antenna device of claim 1, further comprising:

a first transceiver circuit formed between the first side of the printed circuit board and the first non-conductive support member;

a second transceiver circuit formed between the second side of the printed circuit board and the second non-conductive support member;

a first electromagnetic isolation element formed between the first transceiver circuit and the first non-conductive support member, the first electromagnetic isolation element being connected to the ground plane; and a second electromagnetic isolation element formed between the second transceiver circuit and the second non-conductive support member, the second electromagnetic isolation element being connected to the ground plane.

5. The multiple-antenna device of claim 1, further comprising a transceiver circuit formed apart from the printed circuit board and connected to the first and second antennae via wires on the printed circuit board.

6. The multiple-antenna device of claim 1, wherein the first antenna has a first polarization, and wherein the second antennas has a second polarization different from the first polarization.

7. The multiple-antenna device of claim 6, wherein the second polarization is ninety degrees shifted from the first polarization.

8. The multiple-antenna device of claim 1, wherein the first antenna can be connected to a first transceiver using one of a first and a second polarization, and wherein the second antenna can be connected to a second transceiver using one of the first and the second polarization.

9. The multiple-antenna device of claim 1, further comprising:

a first field-shaping element formed on the first side of the printed circuit board, proximate to an outer edge of the first antenna, the first field-shaping element being configured to shape first electromagnetic fields radiating from the first antenna; and a second field-shaping element formed on the second side of the printed circuit board, proximate to an outer edge of the second antenna, the second field-shaping element being configured to shape second electromagnetic fields radiating from the second antenna.

10. A multiple-antenna device comprising:

a printed circuit board having a ground plane configured to provide electromagnetic isolation between a first side of the printed circuit board and a second side of the printed circuit board;

a first non-conductive support member formed over the first side of the printed circuit board;

a second non-conductive support member formed over the second side of the printed circuit board;

a third non-conductive support member formed over the second side of the printed circuit board;

a fourth non-conductive support member formed over the first side of the printed circuit board;

a first antenna formed over the first non-conductive support member;

a second antenna formed over the second non-conductive support member, a third antenna formed over the third non-conductive support member, a fourth antenna formed over the fourth non-conductive support member.

11. The multiple-antenna device of claim 10, further comprising:

a first transceiver circuit formed between the first side of the printed circuit board and the first and fourth non-conductive support members;

a second transceiver circuit formed between the second side of the printed circuit board and the second and third non-conductive support members;

a first electromagnetic isolation element formed between the first transceiver circuit and the first and fourth non-conductive support members, the first electromagnetic isolation element being connected to the ground plane; and a second electromagnetic isolation element formed between the second transceiver circuit and the second and third non-conductive support members, the second electromagnetic isolation element being connected to the ground plane.

12. The multiple-antenna device of claim 10, further comprising a transceiver circuit formed apart from the printed circuit board and connected to the first, second, third, and fourth antennae via wires on the printed circuit board.

13. The multiple-antenna device of claim 10, wherein the first antenna has a first polarization, wherein the second antenna has a second polarization, wherein the third antenna has a third polarization, wherein the fourth antenna has a fourth polarization, wherein the first, second, third and fourth polarizations comprise at least a first polarization orientation and a second polarization orientation different from the first polarization orientation.

14. The multiple-antenna device of claim 13, wherein the second polarization orientation is ninety degrees shifted from the first polarization orientation.

15. The multiple-antenna device of claim 1, wherein the first antenna can be connected to a first transceiver using one of a first and a second polarization, wherein the second antenna can be connected to a second transceiver using one of the first and the second polarization, wherein the third antenna can be connected to a third transceiver using one of a first and a second polarization, and wherein the fourth antenna can be connected to a fourth transceiver using one of a first and a second polarization.

16. The multiple-antenna device of claim 10, further comprising:

a first field-shaping element formed on the first side of the printed circuit board, proximate to an outer edge of at least one of the first and fourth antennae, the first field-shaping element being configured to shape first electromagnetic fields radiating from at least one of the first and fourth antennae; and a second field-shaping element formed on the second side of the printed circuit board, proximate to an outer edge of at least one of the second and third antennae, the second field-shaping element being configured to shape second electromagnetic fields radiating from at least one of the second and third antennae.

17. A multiple-antenna device formed in a printed circuit board comprising:

a first antenna formed on a first side of the printed circuit board;

a second antenna formed on a second side of the printed circuit board;

a ground plane formed between the first antenna and the second antenna, the ground plane configured to provide electromagnetic isolation between the first and second antennae;

a first non-conductive support member formed between the first antenna and the ground plane;

a second non-conductive support member formed between the second antenna and the ground plane, wherein the first antenna is electrically connected to a first feed point on the printed circuit board that is not connected to the ground plane, and wherein the second antenna is electrically connected to a second feed point on the printed circuit board that is not connected to the ground plane.

18. The multiple-antenna device of claim 17, wherein the first and second antennae are each one of: a slot antenna, a patch antenna, a dipole antenna, and an inverted F antenna.

19. The multiple-antenna device of claim 17, wherein the first antenna has a first polarization, and wherein the second antennas has a second polarization different from the first polarization.

20. The multiple-antenna device of claim 17, wherein the first antenna has a first polarization, and wherein the second antennas has a second polarization different from the first polarization.

21. The multiple-antenna device of claim 20, wherein the second polarization is ninety degrees shifted from the first polarization.

* * * * *